US011593211B2

(12) United States Patent
Bhattacharyya et al.

(10) Patent No.: US 11,593,211 B2
(45) Date of Patent: Feb. 28, 2023

(54) APPLYING A FAILURE MANAGEMENT POLICY DURING UPDATING OF COMPONENTS AT AN INFORMATION HANDLING SYSTEM

(71) Applicant: Dell Products L.P., Round Rock, TX (US)

(72) Inventors: Riddhiman Bhattacharyya, West Bengal (IN); Suman Lal Banik, Bangalore (IN); Karthik Sethuramalingam, Bengaluru (IN); Santosh Hanamant Gore, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 22 days.

(21) Appl. No.: 17/232,917

(22) Filed: Apr. 16, 2021

(65) Prior Publication Data

US 2022/0334924 A1 Oct. 20, 2022

(51) Int. Cl.
*G06F 11/14* (2006.01)
*G06F 11/07* (2006.01)
*G06F 8/65* (2018.01)

(52) U.S. Cl.
CPC ............ *G06F 11/1433* (2013.01); *G06F 8/65* (2013.01); *G06F 11/0793* (2013.01); *G06F 11/1471* (2013.01)

(58) Field of Classification Search
CPC .......... G06F 8/60–66; G06F 8/70; G06F 8/71; G06F 11/0793; G06F 11/1433; G06F 11/1471

(Continued)

(56) References Cited

U.S. PATENT DOCUMENTS

| 9,122,711 B1 * | 9/2015 | Nicolini | G06F 11/1458 |
| 2011/0004871 A1 * | 1/2011 | Liu | G06F 11/1433 |
| | | | 717/173 |

(Continued)

FOREIGN PATENT DOCUMENTS

WO WO-2021113305 A1 * 6/2021

OTHER PUBLICATIONS

Gama, Kiev, et al., Dynamically Reconfigurable Trust Policies for Untrustworthy Third-party Components, SAC '16: Proceedings of the 31st Annual ACM Symposium on Applied Computing, Apr. 2016, pp. 1204-1209, [retrieved on Oct. 24, 2022], Retrieved from the Internet: <URL:http://dl.acm.org/>.*

(Continued)

*Primary Examiner* — Geoffrey R St Leger
(74) *Attorney, Agent, or Firm* — McDermott Will & Emery LLP (57) ABSTRACT

Applying failure policy during updating of components, including receiving metadata of each of the components, the metadata indicating a respective classification of each of the components; sorting the components based on the metadata, including identifying a first subset of the components as critical components and a second subset of the components as non-critical components; receiving a first update package for a first component; detecting a failure to apply the first update package to the first component; in response to detecting the failure to apply the first update package to the first component: determining that the first component belongs to the first subset of components; in response to determining that the first component belongs to the first subset of components, identifying a remediation policy associated with critical components; applying the remediation policy to the first component, including rollback of the first update package at the first component.

17 Claims, 4 Drawing Sheets

(58) Field of Classification Search
USPC .......................................... 717/120, 168–178
See application file for complete search history.

(56) References Cited

U.S. PATENT DOCUMENTS

| | | | | |
|---|---|---|---|---|
| 2011/0296248 | A1* | 12/2011 | Vidal | G06F 8/65 |
| | | | | 714/E11.008 |
| 2016/0155131 | A1* | 6/2016 | Miloslavsky | G06Q 30/018 |
| | | | | 705/317 |
| 2018/0293066 | A1* | 10/2018 | Ali | G06F 8/656 |
| 2020/0241868 | A1* | 7/2020 | Murthy | G06F 11/0706 |

OTHER PUBLICATIONS

La Manna, Valerio Panzica, Local Dynamic Update for Component-based Distributed Systems, CBSE '12: Proceedings of the 15th ACM SIGSOFT symposium on Component Based Software Engineering, Jun. 2012, pp. 167-176, [retrieved on Oct. 24, 2022], Retrieved from the Internet: <URL:http://dl.acm.org/>.*

* cited by examiner

APPLYING A FAILURE MANAGEMENT POLICY DURING UPDATING OF COMPONENTS AT AN INFORMATION HANDLING SYSTEM

BACKGROUND

Field of the Disclosure

The disclosure relates generally to an information handling system, and in particular, applying a failure management policy during updating of components at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of applying failure policy during updating of components of an information handling system, the including identifying a plurality of computing components of an information handling system; receiving metadata of each of the plurality of components, the metadata indicating a respective classification of each of the components; sorting the plurality of components based on the metadata, including identifying a first subset of the components as critical components to the information handling system and a second subset of the components as non-critical components to the information handling system; receiving a first update package for a first component of the plurality of components; detecting a failure to apply the first update package to the first component; in response to detecting the failure to apply the first update package to the first component: determining that the first component belongs to the first subset of components; in response to determining that the first component belongs to the first subset of components, identifying a remediation policy associated with critical components; and applying the remediation policy to the first component, including rollback of the first update package at the first component.

Other embodiments of these aspects include corresponding systems, apparatus, and computer programs, configured to perform the actions of the methods, encoded on computer storage devices.

These and other embodiments may each optionally include one or more of the following features. For instance, rollback of the first update package at the first component includes reverting the first component to a previous version. Receiving the first update package for the first component includes receiving a software, firmware, and/or driver update package for the first component. Applying the remediation policy further comprises preventing application of the first update package to other components of the first subset. Receiving a second update package for a second component of the plurality of components; detecting a failure to apply the second update package to the second component; in response to detecting the failure to apply the second update package to the second component: determining that the second component belongs to the second subset of components; in response to determining that the second component belongs to the second subset of components, identifying an additional remediation policy associated with non-critical components; and applying the additional remediation policy to the second component, including logging of the failure to apply the second update package to the second component. Applying the additional remediation policy further comprises allowing application of the second update package to other components of the second subset. Applying the additional remediation policy is independent of rollback of the second update package at the second component.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for applying a failure management policy during updating of components at an information handling system. In short, an update management computing module can detect a failure of application of an update package to computing components (software or hardware) of an information handling system. The update management computing module can identify a classification of the computing component (e.g., critical or non-critical) to a particular data center solution. Based on the classification of the computing component, the update management computing module identifies an appropriate remediation policy, such as rolling back of the update package for critical components and logging the update failure for non-critical components.

Specifically, this disclosure discusses a system and a method for applying failure policy during updating of components of an information handling system, including identifying a plurality of computing components of an information handling system; receiving metadata of each of the plurality of components, the metadata indicating a respective classification of each of the components; sorting the plurality of components based on the metadata, including identifying a first subset of the components as critical components to the information handling system and a second subset of the components as non-critical components to the information handling system; receiving a first update package for a first component of the plurality of components; detecting a failure to apply the first update package to the first component; in response to detecting the failure to apply the first update package to the first component: determining that the first component belongs to the first subset of components; in response to determining that the first component belongs to the first subset of components, identifying a remediation policy associated with critical components; and applying the remediation policy to the first component, including rollback of the first update package at the first component.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
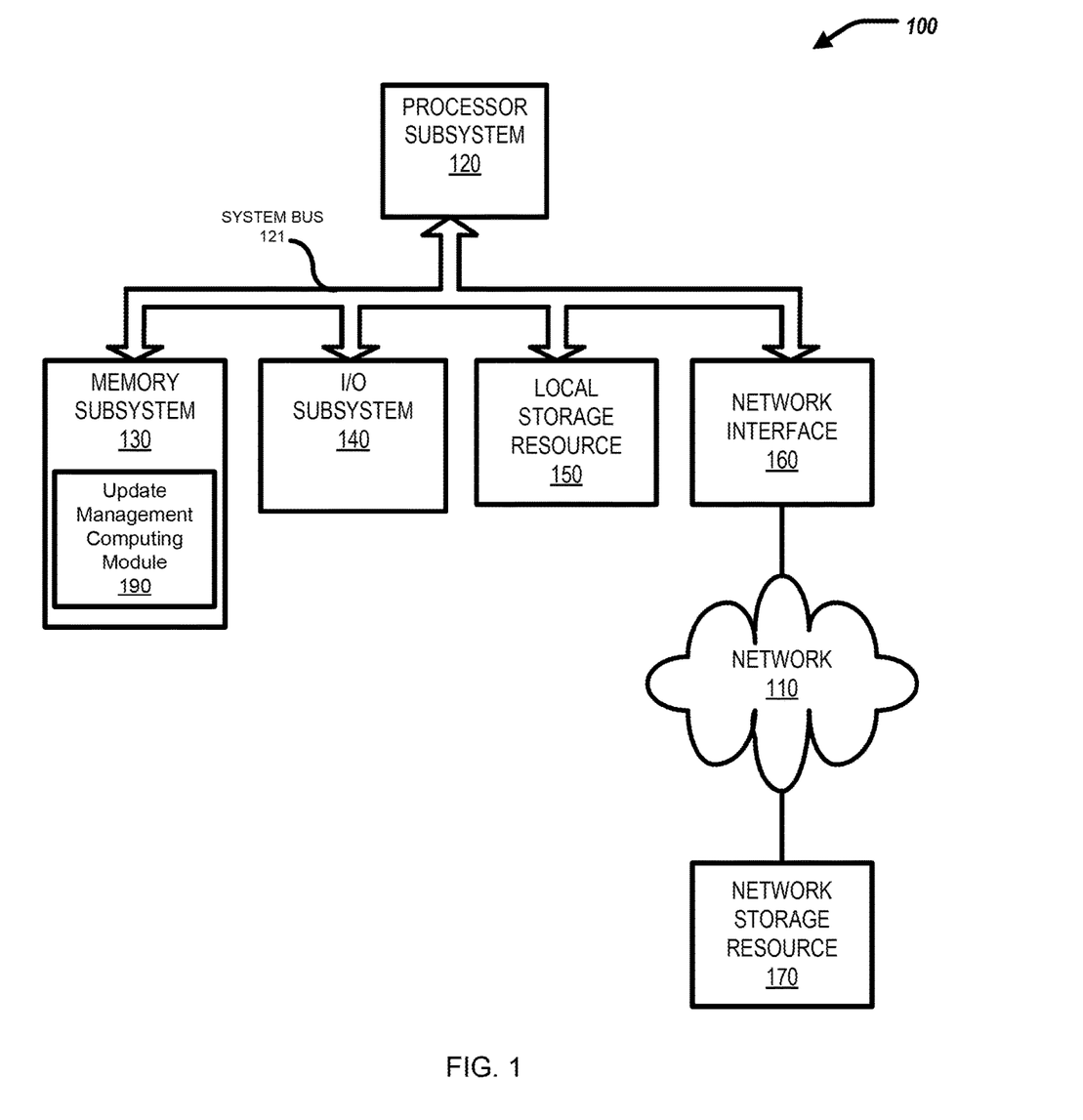
FIG. 1 is a block diagram of selected elements of an embodiment of an information handling system.
Figure 2A:
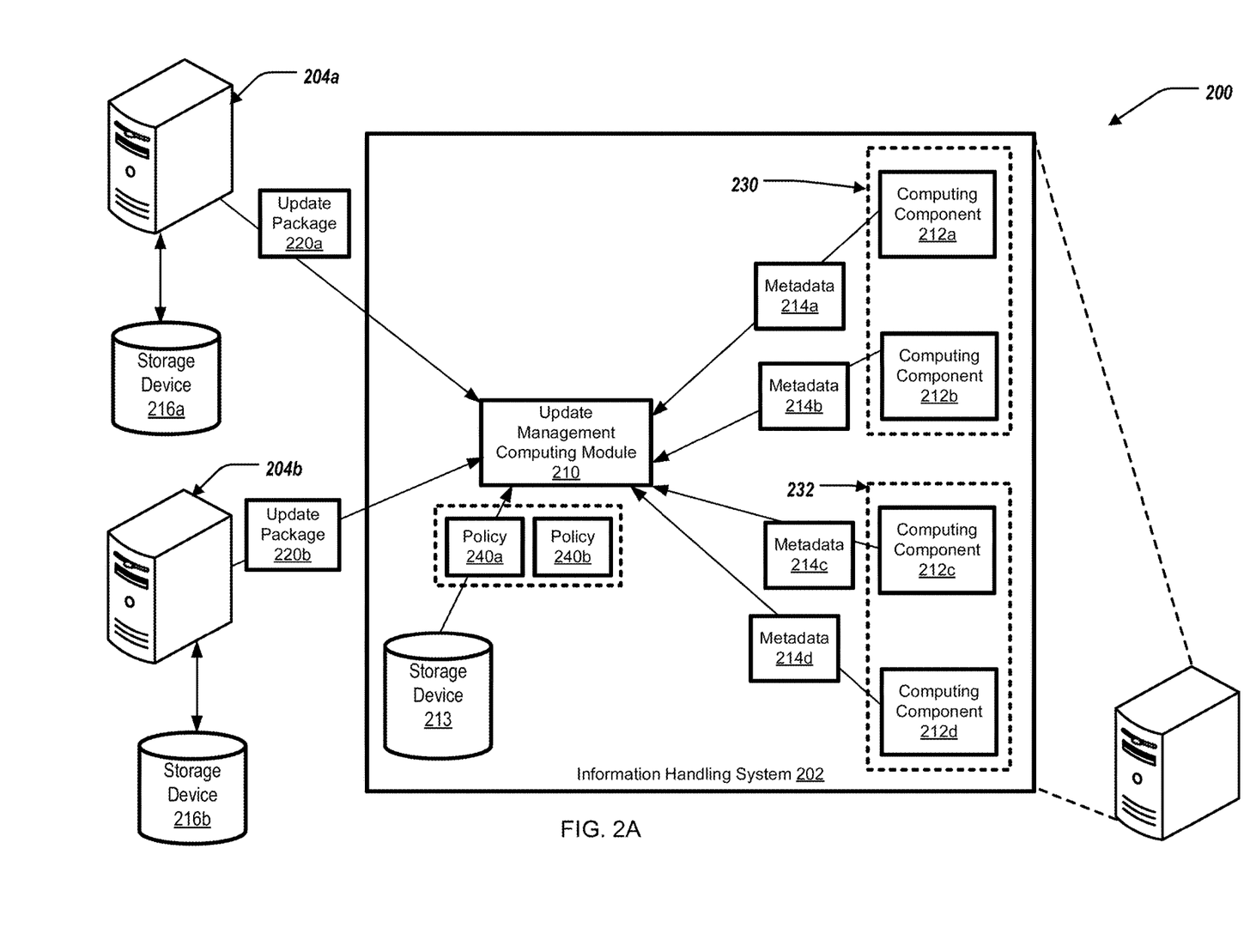
FIGS. 2A, 2B illustrate respective block diagrams of an information handling system for applying a failure management policy during updating of components at an information handling system.
Figure 2B:
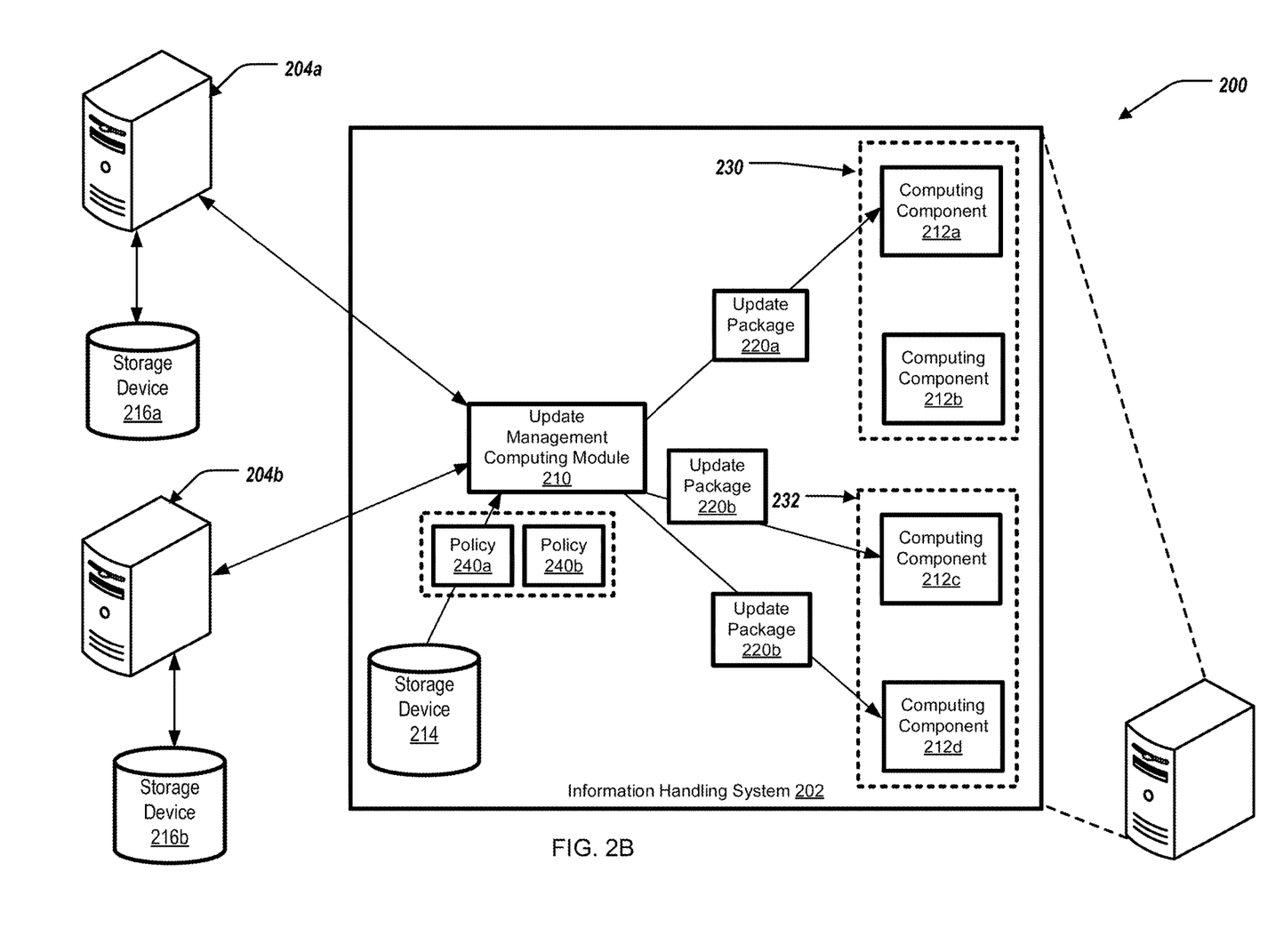
Figure 3:
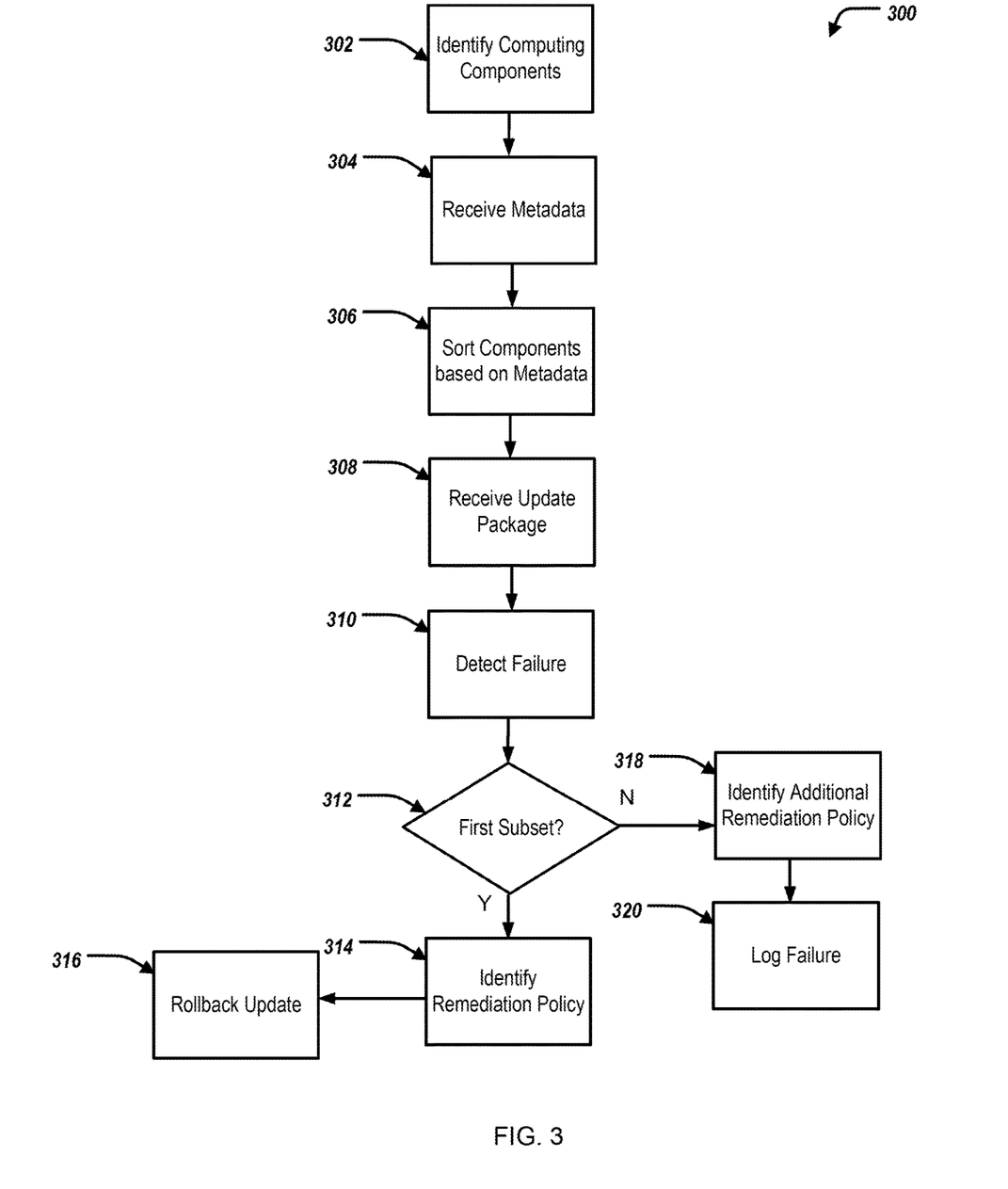
FIG. 3 illustrates a method for applying a failure management policy during updating of components at an information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an update management computing module 190. The update management computing module 190 can be included by the memory subsystem 130. The update management computing module 190 can include a computer-executable program (software). The update management computing module 190 can be executed by the processor subsystem 120.

In short, the update management computing module 190 can detect a failure of application of an update package to computing components (software or hardware) of the information handling system 100. The update management computing module 190 can identify a classification of the computing component (e.g., critical or non-critical) to a particular data center solution. Based on the classification of the computing component, the update management computing module 190 can identify an appropriate remediation policy, such as rolling back of the update package for critical components and logging the update failure for non-critical components.

Turning to FIGS. 2A and 2B, FIGS. 2A, 2B illustrate an environment 200 including information handling systems 202, 204a, 204b. The information handling system 202 can include an update management computing module 210, computing components 212a, 212b, 212c, 212d (collectively referred to as computing components 212), and a storage device 213. The information handling system 204a can further be in communication with a storage device 216a; and the information handling system 204b can further be in communication with a storage device 216b. In some examples, the information handling system 202 is similar to, or includes, the information handling system 100 of FIG. 1. In some examples, the update management computing module 210 is the same, or substantially the same, as the update management computing module 190 of FIG. 1. The information handling system 202 can be in communication with the information handling systems 204a, 204b, over one or more networks (e.g., the Internet).

In some examples, the information handling system 202 can be a part of a cluster computing environment (e.g., a server farm).

The information handling system 202 can include any number of computing components 212—for ease of illustration, only four computing components 212 are shown.

Referring to FIG. 2A, the update management computing module 210 can identify the plurality of computing components 212. In some examples, the computing components 212 can include hardware components that facilitate processing at the information handling system 202, such as processors, video cards, storage devices, servers, routers, cooling systems, etc. In some examples, the computing components 212 can further include any software component that facilitates processing at the information handling system 202, such as operating systems and service administrators. Further the computing components 212 can facilitate cluster computing by the information handling system 202 (as part of a cluster computing environment), and/or virtual machine computing performed by the information handling system 202.

The update management computing module 210 can receive metadata from each of the computing components 212. As shown, the update management computing module 210 receives metadata 214a from (retrieves from) the computing component 212a; the update management computing module 210 receives metadata 214b from (retrieves from) the computing component 212b; the update management computing module 210 receives metadata 220c from (retrieves from) the computing component 212c; and the update management computing module 210 receives metadata 220d from (retrieves from) the computing component 212d. In some examples, the update management computing module 210 can retrieve the metadata 214a, 214b, 214c, 214d (collectively referred to as metadata 214) periodically. In some examples, the update management computing module 210 can retrieve the metadata 214 automatically, or in response to a request.

The metadata 214 can indicate, for each respective computing component 212, a classification of the computing component 212. The computing components 212 can provide the respective metadata 214 including information about a classification type of the component 212 that represents a role of the computing component 212 with respect to computing solutions such as data center solutions. Specifically, the data center solutions can refer to products/service needed to create and maintain a data center, and in particular, software defined storage (SDS) solutions. For example, SDS solutions can include a virtual storage area network (vSAN) or storage spaces direct (S2D). The metadata 214 can include a relevance (weighting) of each computing component 212 for each type of data center solution (SDS solution). The metadata 242 can be stored in data storage (not shown) associated with each of the computing components 212.

The update management computing module 210 can sort the components 212 based on the metadata 214. Specifically, the update management computing module 210 can identify a first subset 230 of the components 212 as critical components to the information handling system 202 based on the metadata 214. That is, the first subset 230 of the components 212 are critical components for the solution (e.g., SDS)—critical components for cluster operation by the (including the) information handling system 202. For example, the first subset 230 of the components 212 can include solid-state drive (SSD) and/or network interface card (NIC) for vSAN. For example, the metadata 214a for the component 212a can include "<Name> PCIe Adaptor </Name> <Classification value=" ">Class-A</Classification>."

Further, the update management computing module 210 can identify a second subset 232 of the components 212 as non-critical components to the information handling system 202 based on the metadata 214. That is, the second subset 232 of the components 212 are non-critical components for the solution (e.g., SDS)—non-critical components for cluster operation by the information (including the) information handling system 202. That is, non-critical components that do not have an impact (or minimal impact) on cluster operation performed by the information handling system 202. For example, the second subset of the components 212 can include an operating system (OS), information system management (iSM) module, or OpenManage Server Administrator (OSMA) for vSAN. For example, the metadata 214c for the component 212c can include "<Name>iDRAC </Name> <Classification value=" ">Class-B</Classification>."

The update management computing module 210 can receive a first update package 220a for the first component 212a. Specifically, the update management computing module 210 can receive the first update package 220a from the information handling system 204a (retrieve the first update package 220a from the information handling system 204a). The information handling system 204 can access the storage device 216a that can store update packages, including the first update package 220a, and provide the first update package 220a to the information handling system 202. The update management computing module 210 can contact the information handling system 204a periodically for update packages for the components 212, automatically, and/or in response to a request. In some examples, the information handling system 204a can automatically provide the update packages from the storage device 216a and to the information handling system 202. In some examples, the information handling system 204a only provides update packages for components 212 of the first subset 230.

In some examples, the first update package 220a can include a software, firmware, and/or driver update package based on the first component 212a. For example, when the first component 212a is software, the first update package 220a can include a software update package. For example, when the first component 212a is hardware, the first update package 220a can include a driver update package. For example, the first update package 220a can include SSD firmware or NIC firmware for vSAN.

The update management computing module 210 can attempt to apply the first update package 220a to the first component 212a, as shown in FIG. 2B. In some examples, in response to attempting to apply the first update package 220a to the first component 212a, the update management computing module 210 can detect a failure to apply the first update package 220a at the first component 212a.

The update management computing module 210, in response to detecting the failure to apply the first update package 220a to the first component 212a, can determine that the first component 212a belongs to the first subset 230 of components 212. That is, the update management computing module 210 determines that the first component 212a is classified as a critical component (e.g., for a particular SDS solution). Further, the update management computing module 210, in response to determining that the first component 212a belongs to the first subset 230 of components 212, identifies a remediation policy 240a associated critical components. That is, the update management computing module 210, in response to determining that the first component 212a belongs to the first subset 230 of components 212, obtains the remediation policy 240a from the storage device 213.

The remediation policy 240a can include a roll back of the first update package 220a—that is, reverting the first component 212a to a previous version (e.g., from a current version associated with the first update package 220a). In some examples, the remediation policy 240a can further include preventing application of the first update package 220a to other components 212 of the first subset 230. In some examples, the remediation policy 240a can further include preventing application of the first update package 220a to other critical components of other information handling systems that are part of the cluster (e.g., server farm). For example, the remediation policy 240a can include "<Policy Name="Critical Component Remediation" AppicableComponents="Class-A"> <Rule key="rollback" value="yes"/> <Rule key="ProceedToNext" value="No"/> <Rule key="notification" value="yes"/> </Policy>."

The update management computing module 210, further in response to detecting the failure to apply the first update package 220a to the first component 212a, applies the remediation policy 240a to the first component 212a. Specifically, the update management computing module 210 can provide rollback of the first update package 220a at the first component 212a. In some examples, the update management computing module 210 can revert the first component 212a to a previous version (e.g., previous software, driver, or firmware version). Additionally, the update management computing module 210 can prevent application of the first update package 220a to the component 212b of the first subset 230.

In some examples, the update management computing module 210 can receive a second update package 220b for the third component 212c. Specifically, the update management computing module 210 can receive the second update package 220b from the information handling system 204b (retrieve the second update package 220b from the information handling system 204b). The information handling system 204b can access the storage device 216b that can store update packages, including the second update package 220b, and provide the second update package 220b to the information handling system 202. The update management computing module 210 can contact the information handling system 204b periodically for update packages for the components 212, automatically, and/or in response to a request. In some examples, the information handling system 204b can automatically provide the update packages from the storage device 216b and to the information handling system 202. In some examples, the information handling system 204b only provides update packages for components 212 of the second subset 232.

In some examples, the second package 220b can include a software, firmware, and/or driver update package based on the third component 212b. For example, when the third component 212c is software, the second update package 220b can include a software update package. For example, when the third component 212c is hardware, the second update package 220b can include a driver update package. For example, the second update package 220b can include an operating system (OS) driver pack for vSAN.

The update management computing module 210 can attempt to apply the second update package 220b to the third component 212c, as shown in FIG. 2B. In some examples, in response to attempting to apply the second update package 220b to the third component 212c, the update management computing module 210 can detect a failure to apply the second update package 220b at the third component 212c.

The update management computing module 210, in response to detecting the failure to apply the second update package 220b to the third component 212b, can determine that the third component 212c belongs to the second subset 232 of components 212. That is, the update management computing module 210 determines that the third component 212c is classified as a non-critical component (e.g., for a particular SDS solution). Further, the update management computing module 210, in response to determining that the third component 212c belongs to the second subset 232 of components 212, identifies an remediation policy 240b associated with non-critical components. That is, the update management computing module 210, in response to determining that the third component 212c belongs to the second subset 232 of components 212, obtains the remediation policy 240b from the storage device 213.

The remediation policy 240b can include allowing application of the second update package 220b to other components 212 of the second subset 232—that is, logging the failure to apply the second update package 220b to the third component 212c and proceeding with application of the second update package 220b to other components 212 of the second subset 232. In some examples, the remediation policy 240b is independent of rollback of the second update package 220b at the third component 212c. That is, the third component 212c is not reverted to a previous version. For example, the remediation policy 240a can include "<Policy Name="Non-Critical Component Remediation" AppicableComponents="Class-B; Class-C" > <Rule key="rollback" value="no"/> <Rule key="ProceedToNext" value="Yes"/> <Rule key="notification" value="yes"/> </Policy>."

The update management computing module 210, further in response to detecting the failure to apply the second update package 220b to the third component 212c, applies the remediation policy 240b to the third component 212c. Specifically, the update management computing module 210 can log the failure to apply the second update package 220b to the third component 212c and proceed with application of the second update package 220b to other components 212 of the second subset 232.

FIG. 3 illustrates a flowchart depicting selected elements of an embodiment of a method 300 for applying a failure management policy during updating of components at an information handling system. The method 300 may be performed by the information handling system 100, the information handling system 202 and/or the update management computing module 210, and with reference to FIGS. 1, 2A, 2B. It is noted that certain operations described in method 300 may be optional or may be rearranged in different embodiments.

The update management computing module 210 identifies the computing components 212 (302). The update management computing module 210 receives the metadata 214 of each of the components 212 (304). The metadata 214 indicates a respective classification of each of the components 212. The update management computing module 210 sorts the components 212 based on the metadata 214 (306). Sorting the components 212 can include the update management computing module 210 identifying the first subset 230 of the components 212 as critical components to the information handling system 202 and the second subset 232 of the components 212 as non-critical components to the information handling system 202. The update management computing module 210 receives an update package for a component 212 (308). The update management computing module 210 detects a failure to apply the update package to the component 212 (310). The update management computing module 210, in response to detecting the failure to apply the update package to the component 212, determines whether the component 212 belongs to the first subset 230 of the components 212 (312). The update management computing module 210 can determine that the component 212 belongs to the first subset 230, and identify the remediation policy 240a associated with critical components (314). The update management computing module 210 can apply the remediation policy 240a, including rollback of the update package at the component 212 (316). The update management computing module 210 can determine that the component 212 belongs to the second subset 232, and identify the remediation policy 240b associated with non-critical components (318). The update management computing module 210 can apply the remediation policy 240b, including logging of the failure to apply the update package to the component 212 (320).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of applying failure policy during updating of components of an information handling system, the method comprising:
    identifying a plurality of computing components of an information handling system, the information handling system part of a cluster computing environment including a plurality of information handling systems;
    receiving metadata of each of the plurality of components, the metadata indicating a respective classification of each of the components;
    sorting the plurality of components based on the metadata, including identifying a first subset of the components as critical components to the information handling system and a second subset of the components as non-critical components to the information handling system;
    receiving a first update package for a first component of the plurality of components;
    detecting a failure to apply the first update package to the first component;
    in response to detecting the failure to apply the first update package to the first component:
        determining that the first component belongs to the first subset of components;
        in response to determining that the first component belongs to the first subset of components, identifying a remediation policy associated with critical components; and
        applying the remediation policy to the first component, including rollback of the first update package at the first component of the information handling system, and preventing i) application of the first update package to other components of the first subset and ii) application of the first update package to other critical components of other information handling systems of the plurality of information handling systems of the cluster computing environment.

2. The computer-implemented method of claim 1, wherein rollback of the first update package at the first component includes reverting the first component to a previous version.

3. The computer-implemented method of claim 1, wherein receiving the first update package for the first component includes receiving a software, firmware, and/or driver update package for the first component.

4. The computer-implemented method of claim 1, further comprising:
    receiving a second update package for a second component of the plurality of components;
    detecting a failure to apply the second update package to the second component;
    in response to detecting the failure to apply the second update package to the second component:
        determining that the second component belongs to the second subset of components;
        in response to determining that the second component belongs to the second subset of components, identifying an additional remediation policy associated with non-critical components; and
        applying the additional remediation policy to the second component, including logging of the failure to apply the second update package to the second component.

5. The computer-implemented method of claim 4, wherein applying the additional remediation policy further comprises allowing application of the second update package to other components of the second subset.

6. The computer-implemented method of claim 4, wherein applying the additional remediation policy is independent of rollback of the second update package at the second component.

7. An information handling system comprising a processor having access to memory media storing instructions executable by the processor to perform operations, comprising:
    identifying a plurality of computing components of an information handling system, the information handling system part of a cluster computing environment including a plurality of information handling systems;
    receiving metadata of each of the plurality of components, the metadata indicating a respective classification of each of the components;
    sorting the plurality of components based on the metadata, including identifying a first subset of the components as critical components to the information handling system and a second subset of the components as non-critical components to the information handling system;
    receiving a first update package for a first component of the plurality of components;
    detecting a failure to apply the first update package to the first component;
    in response to detecting the failure to apply the first update package to the first component:
        determining that the first component belongs to the first subset of components;
        in response to determining that the first component belongs to the first subset of components, identifying a remediation policy associated with critical components; and applying the remediation policy to the first component, including rollback of the first update package at the first component of the information handling system, and preventing i) application of the first update package to other components of the first subset and ii) application of the first update package to other critical components of other information handling systems of the plurality of information handling systems of the cluster computing environment.

8. The information handling system of claim 7, wherein rollback of the first update package at the first component includes reverting the first component to a previous version.

9. The information handling system of claim 7, wherein receiving the first update package for the first component includes receiving a software, firmware, and/or driver update package for the first component.

10. The information handling system of claim 7, the operations further comprising:
receiving a second update package for a second component of the plurality of components;
detecting a failure to apply the second update package to the second component;
in response to detecting the failure to apply the second update package to the second component:
determining that the second component belongs to the second subset of components;
in response to determining that the second component belongs to the second subset of components, identifying an additional remediation policy associated with non-critical components; and
applying the additional remediation policy to the second component, including logging of the failure to apply the second update package to the second component.

11. The information handling system of claim 10, wherein applying the additional remediation policy further comprises allowing application of the second update package to other components of the second subset.

12. The information handling system of claim 10, wherein applying the additional remediation policy is independent of rollback of the second update package at the second component.

13. A non-transitory computer-readable medium storing software comprising instructions executable by one or more computers which, upon such execution, cause the one or more computers to perform operations comprising:
identifying a plurality of computing components of an information handling system, the information handling system part of a cluster computing environment including a plurality of information handling systems;
receiving metadata of each of the plurality of components, the metadata indicating a respective classification of each of the components;
sorting the plurality of components based on the metadata, including identifying a first subset of the components as critical components to the information handling system and a second subset of the components as non-critical components to the information handling system;
receiving a first update package for a first component of the plurality of components;
detecting a failure to apply the first update package to the first component;
in response to detecting the failure to apply the first update package to the first component:
determining that the first component belongs to the first subset of components;
in response to determining that the first component belongs to the first subset of components, identifying a remediation policy associated with critical components; and
applying the remediation policy to the first component, including rollback of the first update package at the first component of the information handling system, and preventing i) application of the first update package to other components of the first subset and ii) application of the first update package to other critical components of other information handling systems of the plurality of information handling systems of the cluster computing environment.

14. The non-transitory computer-readable medium of claim 13, wherein rollback of the first update package at the first component includes reverting the first component to a previous version.

15. The non-transitory computer-readable medium of claim 13, wherein receiving the first update package for the first component includes receiving a software, firmware, and/or driver update package for the first component.

16. The non-transitory computer-readable medium of claim 13, the operations further comprising:
receiving a second update package for a second component of the plurality of components;
detecting a failure to apply the second update package to the second component;
in response to detecting the failure to apply the second update package to the second component:
determining that the second component belongs to the second subset of components;
in response to determining that the second component belongs to the second subset of components, identifying an additional remediation policy associated with non-critical components; and
applying the additional remediation policy to the second component, including logging of the failure to apply the second update package to the second component.

17. The non-transitory computer-readable medium of claim 16, wherein applying the additional remediation policy further comprises allowing application of the second update package to other components of the second subset.

* * * * *